United States Patent Office 2,969,387
Patented Jan. 24, 1961

2,969,387
ALKYLENE AND ARYLENE DI(SULFONYL-ALKANOATES)

Christian F. Horn, New York, N.Y., Fritz Hostettler, Charleston, and Nelson R. Eldred, South Charleston, W. Va., assignors to Union Carbide Corporation, a corporation of New York No Drawing. Filed Oct. 7, 1957, Ser. No. 688,422

15 Claims. (Cl. 260—481)

This invention relates to novel compounds that are useful in the preparation of high melting and readily dyeable synthetic textile fibers of high strength and excellent thermal stability.

The compounds of the invention are characterized by the general formula

I.          R'[SO$_2$RCOOX]$_2$ in which the R's and R''s are saturated divalent hydrocarbon radicals and the X's are hydrogen or saturated lower alkyl radicals.

The disulfones that are preferred particularly for use in forming synthetic textile fibers are those having a symmetrical structure in which the X's are methyl groups, the R's are unsubstituted polymethylene groups containing from three to six carbon atoms and the R''s are straight or branched chain alkylene radicals containing from two to ten carbon atoms or para-dialkylene phenylene radicals containing up to ten carbon atoms. Higher alkyl diesters such as ethyl, propyl, etc. are also useful in the preparation of synthetic textile fibers so long as the terminal alkyl radicals are capable of forming alcohols boiling below about 200° C. Disulfones having less than three carbon atoms in the R groups are not preferred for the preparation of synthetic textile fibers because they do not have the excellent thermal stability of those in which the R's contain a greater number of carbon atoms. Disulfones having more than six carbon atoms in the R groups tend to form resins having melting points that are below those generally considered desirable.

The disulfones of the invention can be prepared in several ways. One method of preparation that has been found suitable involves reacting an alkyl dichloride, R'Cl$_2$, in which the R' is as defined with reference to Formula I, with a salt of a mercapto carboxylic acid, HSRCOOH, in which the R is as defined with reference to Formula I, prepared by reacting the acid with sodium hydroxide in the presence of aqueous ethanol, to form the corresponding dithiol dicarboxylic acid and oxidizing the acid thus formed with peracetic acid or other suitable oxidizing agent to convert it into the corresponding sulfonyl dicarboxylic acid. If a diester is desired, the sulfonyl dicarboxylic acid can be esterified with the appropriate alcohol. The entire sequence of reaction for forming a disulfonyl dicarboxylic acid and then esterifying it to the corresponding dimethyl ester is illustrated as follows:

II(A)        R'Cl$_2$+NaSRCOONa

(B)           R'[SRCOOH]$_2$

 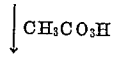

(C)           R'[SO$_2$RCOOH]$_2$

 

R'[SO$_2$RCOOCH$_3$]$_2$

The compounds of the invention are distinguished by high thermal stability, a characteristic that is important in the melt polymerization or copolymerization involved in the preparation of synthetic textile fibers. They are capable of forming excellent fibers by polycondensation with various diols and diamines and are also useful in modifying polyethylene terephthalate fibers and filaments to make them more receptive to dyeing without appreciably lowering their melting points.

These and other advantages, as well as the utility of the compounds of the invention, and a more detailed description of several methods of preparation, will become apparent from the following examples included to set forth the best modes now contemplated for carrying out the invention.

EXAMPLE 1

*Part A.—Preparation of 4,4'-(tetramethylenedithio)dibutyric acid*

1,4-dichlorobutane (127 grams) and 228 grams of thiourea were dissolved in 250 ml. of water by heating for eight hours under reflux. Sodium hydroxide (180 grams) in 250 ml. of water was added slowly and heated under reflux for six hours. The oily layer was separated and distilled, yielding 98 grams of 1,4-butanedithiol having a refractive index n 30/D of 1.5247.

The 1,4-butanedithiol (25 grams) was dissolved in 150 ml. of 80% aqueous ethanol containing 16.5 grams of sodium hydroxide. Dibutyl "Carbitol" (250 ml.) was added, and the water and ethanol were distilled off. Butyrolactone (50 grams) was added slowly at a kettle temperature of 190 to 210° C. and the heating continued for twenty-four hours. The product was filtered and the filtrate dissolved in water and acidified. After recrystallization from benzene, 29 grams of 4,4'-(tetramethylenedithio)dibutyric acid, melting at 98° C., were obtained.

*Alternative preparation of 4,4'-(tetramethylenedithio)-dibutyric acid*

Butyrolactone (1004 grams) and 30 grams of zinc chloride were treated with hydrogen chloride at 90° C. until no more gas was absorbed. The product was diluted with 350 ml. of chloroform and washed with water. The chloroform was removed under vacuum, and the 4-chlorobutyric acid was rapidly distilled yielding 1143 grams of crude product boiling at 83° C. at 3.5 mm. and having a refractive index n 30/D of 1.4472.

4-chlorobutyric acid (613 grams) and 419 grams of thiourea were reacted in the manner described above to yield 316 grams of 4-mercaptobutyric acid.

4-mercaptobutyric acid (632 grams) and 421 grams of sodium hydroxide were dissolved in two liters of water containing 750 ml. of ethanol. This was heated under reflux, and 334 grams of 1,4-dichlorobutane were added dropwise. After heating for 3½ hours with stirring, the ethanol was removed by distillation, the solution was cooled and acidified yielding crude 4,4'-(tetramethylenedithio)dibutyric acid. The product was purified by dissolving in aqueous caustic, extracting with ether, reacidifying, and recrystallizing from benzene. It was obtained in a yield of 1024 grams and had a melting point of 99° C.

*Part B.—Preparation of 4,4'-(tetramethylenedisulfonyl)-dibutyric acid*

4,4'-(tetramethylenedithio)dibutyric acid (36 grams) was dissolved in 250 ml. of water containing 10 grams of sodium hydroxide and treated dropwise with peracetic acid at 45° C. Enough sodium hydroxide was added at the same time to keep the pH of the reaction at 6–7. After the addition was complete, the mixture was stirred for one hour, then acidified to pH 1. The 4,4'-(tetramethylenedisulfonyl)dibutyric acid was recrystallized from dimethylformamide and washed with water. It was obtained in a yield of 38 grams and had a melting point of 220° C.

*Part C.—Preparation of dimethyl 4,4'-(tetramethylenedisulfonyl)-dibutyrate*

4,4' - (tetramethylenedisulfonyl)dibutyric acid (23 grams) was heated under reflux for twenty hours in one liter of methanol containing 200 cc. of sulfuric acid. The reaction mixture was chilled in ice, precipitating the methyl ester which was collected on a filter, washed with ether, and recrystallized from methanol. It was obtained in a yield of 23 grams and had a melting point of 134° C. Carbon and hydrogen contents for $(CH_2)_4[SO_2(CH_2)_3COOCH_3]_2$ or $C_{14}H_{26}O_8S_2$ are:
Calculated: C=43.52% b.w.; H=6.78% b.w. Found on analysis: C=43.62% b.w.; H=6.43% b.w.

EXAMPLE 2

*Part A.—Preparation of 4,4'-(para-xylylenedithio)-dibutyric acid*

Para-xylylenedithiol, described in the literature [Berichte, 33, 730 (1900)], as a solid melting at 46 to 47° C., was prepared by reacting alpha,alpha'-dichloro-para-xylene with thiourea in a manner similar to that described in Example 1.

Para-xylylenedithiol (67 grams) was dissolved in 800 ml. of water containing 33 grams of sodium hydroxide and placed in a steel rocking autoclave together with 92 grams of butyrolactone. The reactor was heated at 245° C. for twenty-two hours. From this reaction, by recrystallization from 1:1 benzene-carbon tetrachloride, there were isolated 43 grams of impure 4,4'-(para-xylylenedithio)-dibutyric acid melting at 119° C.

*Alternative preparation of 4,4'-(para-xylylenedithio)-dibutyric acid*

4-mercaptobutyric acid (122 grams), prepared as described in Example 1, was dissolved in 500 ml. of 2N sodium hydroxide and heated under reflux. Alpha,alpha'-dichloropara-xylene was added while heating. After heating for four hours, the solution was cooled, filtered to remove traces of solid, and acidified. The crude product was recrystallized from acetone by chilling in solid carbon dioxide. It was obtained in a yield of 156 grams and had a melting point of 122° C.

*Part B.—Preparation of dimethyl 4,4'-(para-xylylenedisulfonyl)dibutyrate*

4,4'-(para-xylylenedithio)dibutyric acid (22 grams) was esterified by dissolving it in 1.5 liters of methanol containing 2 ml. of sulfuric acid. After heating under reflux for one day, the solution was cooled, neutralized with sodium acetate, and evaporated. The residue was taken up in acetone, the sodium sulfate removed by filtration, and the acetone solution heated to 45° C. A 25% solution of peracetic acid in acetone (50% more than the calculated amount) was added slowly at this temperature, and the reaction mixture was stirred for three hours after the completion of the addition. After recrystallizing from dioxane, the material melted at 188° C.; the yield was 21 grams. Carbon and hydrogen contents for

or $C_{18}H_{26}O_8S_2$ are:
Calculated: C=49.75% b.w.; H=6.03% b.w. Found on analysis: C=50.24% b.w.; H=6.20% b.w.

EXAMPLE 3

*Part A.—Preparation of 5,5'-(ethylenedithio)divaleric acid*

6-mercaptovaleric acid (352 grams) was dissolved in a solution of sodium hydroxide (212 grams in two liters of 25% aqueous ethanol) and heated at reflux for one hour in a three-liter four-neck flask equipped with stirrer, condenser, thermometer, and dropping funnel. Thereafter ethylene dichloride (131 grams) was added dropwise accompanied by agitation and the mixture refluxed for four hours after the addition was completed. The ethanol was then distilled and the aqueous solution acidified to pH 1 and filtered. After a recrystallization from acetone and a second one from ethyl acetate, the desired product was obtained in 75% yield as a white, crystalline solid having a melting point of 104 to 105° C.

*Part B.—Preparation of dimethyl 5,5'-(ethylenedithio)-divalerate*

5,5'-(ethylenedithio)divaleric acid (389 grams) was refluxed in methanol (3000 grams) and in the presence of sulfuric acid (2 cc.) over a period of fifty-four hours in a five-liter flask. The latter was connected to a column by the "double distill apparatus." The solution was cooled, poured into two liters of water and the oil layer was extracted with ether. After drying with calcium chloride, the ether was evaporated on the steam bath and the residue product distilled under reduced pressure. The desired product was obtained as a colorless liquid in 79% yield. It had a boiling point of 196 to 197° C. at 45 mm. and an index of refraction n 30/D of 1.4986.

*Part C.—Preparation of dimethyl 5,5'-(ethylenedisulfonyl)-divalerate*

To a solution of 50 grams of dimethyl 5,5-(ethylenedithio)divalerate in 250 cc. dimethylformamide, 256 grams of 25% peracetic acid in ethyl acetate was added slowly at 50 to 60° C., accompanied by agitation. The reaction mixture was heated for two hours at 70° C. after the addition was completed. When cooled the sulfone began to crystallize out of the solution, was filtered, and recrystallized from dioxane. The product was obtained in 93% yield as colorless leaflets and had a melting point of 154 to 156° C. Carbon and hydrogen contents for $(CH_2)_2[SO_2(CH_2)_4COOCH_3]_2$ or $C_{14}H_{26}O_8S_2$ are:
Calculated: C=43.52% b.w.; H=6.78% b.w. Found on analysis: C=43.55% b.w.; H=6.57% b.w.

EXAMPLE 4

*Part A.—Preparation of 5,5'-(para-xylylenedithio)-divaleric acid*

5-mercaptovaleric acid (397 grams) and para-xylene dichloride (228 grams) were dissolved in methanol (one liter) and heated to 50 to 60° C. At this temperature a solution of sodium hydroxide (237 grams dissolved in 500 cc. water) was added dropwise over a period of 1.5 hours. Sodium chloride began to precipitate before the addition was complete. After the addition the methanol was distilled, the solution acidified to pH 1 with dilute hydrochloric acid, and the crude 5,5'-(para-xylylenedithio)divaleric acid was filtered and washed with water. After two recrystallizations from acetone and one from acetonitrile, the acid was obtained in 81% yield. It had a melting point at 118.5 to 120° C.

*Part B.—Preparation of dimethyl 5,5'-(para-xylylenedithio)divalerate*

5,5'-(para-xylylenedithio)divaleric acid (372 grams) was dissolved in methanol (3500 cc.) and refluxed over a period of forty-eight hours in the presence of sulfuric acid (2 cc.). The mixture was then poured into two liters of water whereby an oil layer separated. The aqueous layer was extracted with ether and combined with the oil layer. The etheral solution was dried over calcium chloride, filtered, and evaporated on the steam bath. The residue was distilled under reduced pressure and the desired product was obtained in 95% yield. It had a melting point at 39 to 41° C.

*Part C.—Preparation of dimethyl 5,5'-(para-xylylenedisulfonyl)divalerate*

Dimethyl 5,5'-(para-xylylenedithio)divalerate (410 grams) was dissolved in dimethylformamide (two liters) and oxidized with 25% peracetic acid in ethyl acetate (2000 grams) at 60 to 70° C. The solution was heated for two hours at 65° C. after the addition of peracetic acid was complete. On cooling the sulfone crystallized and was filtered. After two recrystallizations from dioxane, dimethyl 5,5'-(para-xylylenedisulfonyl)divalerate was obtained in 85% yield in the form of white needles having a melting point at 173 to 174.5° C. Carbon and hydrogen contents for

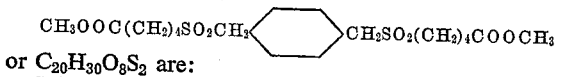

or $C_{20}H_{30}O_8S_2$ are:

Calculated: C=51.94% b.w.; H=6.54% b.w. Found on analysis: C=51.70% b.w.; H=6.58% b.w.

EXAMPLE 5

*Part A.—Preparation of 6,6'-(ethylenedithio)dicaproic acid*

The following starting materials were subjected to the same reaction procedure as described in Part A of Example 3.

6-mercaptocaproic acid (445 grams), sodium hydroxide (240 grams) dissolved in two liters of 25% ethanol, and ethylene dichloride (148 grams).

After recrystallizations from acetic acid and water, the desired product was obtained in 90% yield. It had a melting point of 120 to 122° C.

*Part B.—Preparation of dimethyl 6,6'-(ethylenedithio)dicaproate*

6,6'-(ethylenedithio)dicaproic acid (250 grams) was dissolved in 3000 grams of methanol and refluxed over a period of forty-eight hours in the presence of 2 cc. of sulfuric acid. The mixture was then poured into two liters of water whereby the oil layer separated. The aqueous layer was extracted with ether and combined with the oil layer. The etheral solution was dried over calcium chloride, filtered and evaporated on the steam bath. The residue was distilled under reduced pressure and the desired product was obtained in 89% yield. It had a boiling point of 217 to 219° C. at 0.4 mm. and an index of refraction n 30/D of 1.4952.

*Part C.—Preparation of dimethyl 6,6'-(ethylenedisulfonyl)dicaproate*

To a solution of 50 grams dimethyl 6,6'-(ethylenedithio)dicaproate in 250 cc. dimethylformamide, 236 grams of 25% peracetic acid in ethyl acetate were added over a period of 0.5 hour at 60 to 70° C. The solution was heated for two hours at 65° C. after the addition was complete. On cooling the sulfone crystallized and was filtered. After two recrystallizations from dioxane, the desired product was obtained in 97% yield in the form of white needles having a melting point of 138 to 140° C. Carbon and hydrogen contents for $(CH_2)_2[SO_2(CH_2)_5COOCH_3]_2$ or $C_{16}H_{30}O_8S_2$ are:

Calculated: C=46.37% b.w.; H=7.24% b.w. Found on analysis: C=46.83% b.w.; H=7.18% b.w.

EXAMPLE 6

*Part A.—Preparation of 6,6'-(trimethylenedithio)dicaproic acid*

6-mercaptocaproic acid (721 grams) was converted to the sodium salt by dissolving in an aqueous-ethanolic solution of 400 grams sodium hydroxide and then reacted according to the procedure described in Part A of Example 3 with trimethylene dichloride. The final product was recrystallized from acetone and ethyl acetate and obtained in 73% yield. It had a melting point of 95 to 98° C.

*Part B.—Preparation of dimethyl 6,6'-(trimethylenedithio)dicaproate*

6,6'-(trimethylenedithio)dicaproate acid (830 grams) was esterified with methanol in the presence of sulfuric acid according to the procedure described in Part B of Example 3.

The desired product was obtained in 88% yield as a colorless liquid having a boiling point of 208 to 212° C. at 0.6 to 0.65 mm.

*Part C.—Preparation of dimethyl 6,6'-(trimethylenedisulfonyl)dicaproate*

Dimethyl 6,6'-(trimethylenedithio)dicaproate (125 grams) was oxidized in dimethylformamide (1350 cc.) with 680 grams of 25% peracetic acid in ethyl acetate according to the procedure described in Part C of Example 5.

The desired product was obtained in 92% yield in the form of white needles having a melting point of 150 to 151° C. Carbon and hydrogen contents for

or $C_{17}H_{32}O_8S_2$ are:

Calculated: C=47.66% b.w.; H=7.71% b.w. Found on analysis: C=47.85% b.w.; H=7.62% b.w.

EXAMPLE 7

*Part A.—Preparation of 6,6'-(tetramethylenedithio)dicaproic acid*

Epsilon-caprolactone was reacted with hydrogen chloride in a manner similar to the alternative procedure described in Part A of Example 1 to yield 6-chlorocaproic acid which in turn was reacted with thiourea to yield 6-mercaptocaproic acid having a refractive index n 30/D of 1.4804.

6-mercaptocaproic acid (20 grams) was dissolved in 200 ml. of ethanol containing 10.8 grams of sodium hydroxide. The solution was heated to reflux, and 8.6 grams of 1,4-dichlorobutane were added dropwise. After heating for four hours, the solvent was evaporated, the residue was dissolved in 400 ml. of water, and the solution was acidified. The crude 6,6'-(tetramethylenedithio)dicaproic acid was recrystallized from benzene. The yield was 21 grams. It had a melting point of 105° C.

*Part B.—Preparation of 6,6'-(tetramethylenedisulfonyl)dicaproic acid*

4,4'-(tetramethylenedithio)dicaproic acid (146 grams) was oxidized with peracetic acid at pH 6–7 in a manner similar to that described in Part C of Example 1. The product weighed 156 grams and melted at 199° C.

*Part C.—Preparation of dimethyl 6,6'-(tetramethylenedisulfonyl)dicaproate*

4,4'-(tetramethylenedisulfonyl)dicaproic acid (62 grams) was dissolved in 150 ml. benzotrichloride by heating and stirring for three hours at 195° C. The excess benzotrichloride was distilled under reduced pressure, the residue was taken up in 600 ml. dioxane, heated to boiling, and treated slowly with 300 ml. methanol. The solution was treated with decolorizing carbon, filtered and cooled. The desired dimethyl ester was recrystallized from 3:1 methanol-dioxane. The yield was 50 grams. It had a melting point of 129° C. Carbon and hydrogen contents for

or $C_{18}H_{34}O_8S_2$ are:

Calculated: C=48.85% b.w.; H=7.74% b.w. Found on analysis: C=48.89% b.w.; H=7.59% b.w.

EXAMPLE 8

*Part A—Preparation of 6,6'-(pentamethylenedithio)dicaproic acid*

6-mercaptocaproic acid (741 grams) was dissolved in a solution of 400 grams of sodium hydroxide in 2.5 liters of 20% aqueous ethanol and heated to reflux in a five-liter flask equipped with a stirrer, condenser, thermometer, and dropping funnel. Pentamethylene dichloride (352 grams) was added dropwise over a period of one hour and the mixture then refluxed for 4.5 more hours. Thereafter, ethanol was distilled out and the aqueous solution was acidified to pH 1 with concentrated hydrochloric acid.

The final product was obtained in 86% yield after recrystallization from acetone. It had a melting point of 106 to 107° C.

*Part B.—Preparation of dimethyl 6,6'-(pentamethylenedithio)dicaproate*

6,6'-(pentamethylenedithio)dicaproic acid (784 grams) was esterified with excess methanol in the presence of 2 cc. of sulfuric acid by refluxing the mixture over a period of seventy-six hours. Thereafter, most of the methanol was distilled out and the remaining concentrated solution was cooled, whereupon the dimethyl ester crystallized. The final product was recrystallized from a little methanol and then from acetone and was obtained in 71% yield. It had a melting point of 38 to 39.5° C.

*Part C.—Preparation of dimethyl 6,6'-(pentamethylenedisulfonyl)dicaproate*

Dimethyl 6,6'-(pentamethylenedithio)dicaproate (350 grams) was oxidized in dimethylformamide (1.5 liters) with 25% peracetic acid solution in ethyl acetate (1420 grams) according to procedure described in Part C of Example 5.

After one recrystallization from dioxane, the desired product was obtained in more or less quantitative yield. It had a melting point of 132 to 133.5° C. Carbon and hydrogen contents for $(CH_2)_5[SO_2(CH_2)_5COOCH_3]_2$ or $C_{19}H_{36}O_8S_2$ are:

Calculated: C=50.00% b.w.; H=7.89% b.w. Found on analysis: C=50.03% b.w.; H=7.81% b.w.

EXAMPLE 9

*Part A.—Preparation of 6,6'-(hexamethylenedithio)dicaproic acid*

6-mercaptocaproic acid (148 grams) was dissolved in aqueous-alcoholic caustic solution (80 grams of sodium hydroxide dissolved in 750 cc. water and 200 cc. ethanol) and the mixture was refluxed for 0.5 hour in a two-liter four-neck flask equipped with stirrer, condenser, dropping funnel, and thermometer. The solution was then cooled to 80° C. and 77.5 grams of hexamethylene dichloride were added over a period of one hour. Thereafter, the reaction mixture was further refluxed for 3.5 hours, cooled, acidified to pH 1 with sulfuric acid, and filtered.

The crude product was recrystallized from carbon tetrachloride and methanol and the dicaproic acid was obtained in 91% yield. It had a melting point of 108 to 109.5° C.

*Part B.—Preparation of dimethyl 6,6'-(hexamethylenedithio)dicaproate*

6,6'-(hexamethylenedithio)dicaproic acid (85 grams) was dissolved in excess methanol and refluxed in the presence of 30 cc. of sulfuric acid as esterification catalyst for twenty-eight hours in a five-liter flask equipped with reflux condenser. Thereafter, most of the methanol was distilled out until one liter of solution remained. The solution was cooled, poured into two liters of ice water, and the precipitated ester was filtered.

The desired product was obtained in 100% yield. It had a melting point of 39 to 40° C.

*Part C.—Preparation of dimethyl 6,6'-(hexamethylenedisulfonyl)dicaproate*

Dimethyl 6,6' - (hexamethylenedisulfonyl)dicaproate (855 grams) was oxidized in dimethylformamide (six liters) with 25% peracetic acid in ethyl acetate according to the procedure described in Part C of Example 5.

After recrystallizations from dioxane and acetone, the desired product was obtained in almost quantitative yield. It had a melting point of 124 to 125° C. Carbon and hydrogen contents for $(CH_2)_6[SO_2(CH_2)_5COOCH_3]_2$ or $C_{20}H_{38}O_8S_2$ are:

Calculated: C=51.05% b.w.; H=8.14% b.w. Found on analysis: C=51.20% b.w.; H=8.14% b.w.

EXAMPLE 10

*Part A.—Preparation of 6,6'-(3-methylpentamethylenedithio)dicaproic acid*

6-mercaptocaproic acid (385 grams) and 3-methylpentamethylene dibromide (305 grams) were dissolved in methanol (500 cc.) and an aqueous solution of sodium hydroxide (208 grams in 500 cc.) was added dropwise over a period of 1.5 hours at 25 to 75° C. The mixture was then refluxed for three hours and the methanol distilled out thereafter. The solution was acidified with concentrated hydrochloric acid to pH 1 and filtered to separate the resulting precipitate. This was washed with warm water, dried, and recrystallized several times from acetonitrile, ethyl acetate, and isopropyl ether.

6,6' - (3 - methylpentamethylenedithio)dicaproic acid, melting at 111 to 113° C., was obtained in good yield.

*Part B.—Preparation of dimethyl 6,6'-(3-methylpentamethylenedisulfonyl)dicaproate*

6,6' - (3 - methylpentamethylenedithio)dicaproic acid (416 grams) was dissolved in excess methanol and refluxed in the presence of 2 cc. sulfuric acid for fifty-three hours in a "double distill apparatus." Two liters of methanol were distilled out and 25% peracetic acid in ethyl acetate (1670 grams) was added dropwise at 50° C. over a period of two hours to carry out the oxidation to the disulfone. After recrystallizations from methanol and isopropanol, dimethyl 6,6'-(3-methylpentamethylenedisulfonyl)dicaproate was obtained in 44% yield. It had a melting point of 79 to 82° C.

*Part C.—Preparation of 6,6'-(3-methylpentamethylenedisulfonyl)dicaproic acid*

Dimethyl 6,6' - (3 - methylpentamethylenedisulfonyl)dicaproate (202 grams) was refluxed with 3-molar sodium hydroxide (1000 cc.) over a period of eight hours. The mixture was acidified to pH 1 with hydrochloric acid; the crude acid was filtered and washed with water. For complete removal of sodium chloride, the acid was dissolved in acetonitrile and filtered hot. The crude acid was treated with charcoal and recrystallized from dilute hydrochloric acid and acetonitrile.

6,6' - (3 - methylpentamethylenedisulfonyl)dicaproic acid was obtained in almost quantitative yield. Carbon and hydrogen contents for

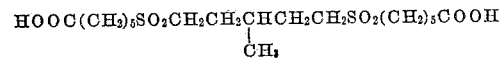

or $C_{18}H_{34}O_8S_2$ are:

Calculated: C=48.86% b.w.; H=7.75% b.w. Found on analysis: C=48.76% b.w.; H=7.74% b.w.

EXAMPLE 11

*Part A.— Preparation of 6,6'-(decamethylenedithio)dicaproic acid*

6,6'-(decamethylenedithio)dicaproic acid was prepared in the manner described in Part A of Example 10 from 6-mercaptohexanoic acid (248 grams), decamethylene dibromide (250 grams), and sodium hydroxide (134 grams, dissolved in 300 cc. water). The crude acid was recrystallized from acetone, benzene, and acetonitrile and obtained in 83% yield. It had a melting point of 113.5 to 115° C.

Part B.—Preparation of dimethyl 6,6'-(decamethylenedisulfonyl)dicaproate 6,6'-(decamethylenedithio)dicaproic acid (300 grams) was esterified with methanol in the presence of sulfuric acid according to the procedure described in Part B of Example 10.

Dimethyl 6,6'-(decamethylenedithio)dicaproate was recrystallized three times from methanol and obtained in 79% yield and good purity in the form of a white crystalline solid melting at 53 to 54° C.

Dimethyl 6,6'-(decamethylenedithio)dicaproate (210 grams) was oxidized in dimethylformamide (1000 cc.) with 25% peracetic acid solution in ethyl acetate (1268 grams), likewise in the manner described in Part B of Example 10. After three recrystallizations from acetonitrile, the corresponding disulfone was obtained in 91% yield. It had a melting point of 128.5 to 130° C.

Part C.—Preparation of 6,6'-(decamethylenedisulfonyl)dicaproic acid

Dimethyl 6,6' - (decamethylenedisulfonyl)dicaproate (259 grams) was hydrolyzed with 2-molar sodium hydroxide (1000 cc.) by refluxing the mixture over a period of six hours. The solution was then acidified with concentrated hydrochloric acid to pH 1. After two recrystallizations from dimethyl-formamide, 6,6'-(decamethylenedisulfonyl)dicaproic acid was obtained in 90% yield. It melted at 184 to 186° C. Carbon and hydrogen contents for $(CH_2)_{10}[SO_2(CH_2)_5COOH]_2$ or $C_{22}H_{42}O_8S_2$ are:

Calculated: C=52.98% b.w.; H=8.49% b.w. Found on analysis: C=53.39% b.w.; H=8.64% b.w.

EXAMPLE 12

6,6'-(para-xylylenedisulfonyl)dicaproate was prepared be reacting alpha-alpha'-dichloro-para-xylene with 6-mercaptocaproic acid, esterifying it with methanol, and oxidizing with peracetic acid in a manner similar to that described in Example 2. The dimethyl 6,6'-(para-xylylenedisulfonyl)dicaproate thus obtained is a solid melting at 163° C. Carbon and hydrogen contents for

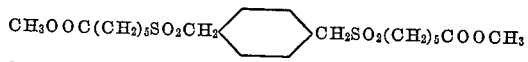

or $C_{22}H_{34}O_8S_2$ are:

Calculated: C=53.85% b.w.; H=6.99% b.w. Found on analysis: C=53.96% b.w.; H=7.08% b.w.

EXAMPLE 13

Part A.—Preparation of dimethyl 4,4'-(decamethylenedisulfonyl)dibutyrate

Methyl 4-mercaptobutyrate (160 grams) and decamethylene bromide (170 grams) were placed in a two-liter four-neck flask equipped with a stirrer, condenser, thermometer and dropping funnel. A methanolic solution of sodium hydroxide (48 grams in one liter methanol) was added dropwise over a period of 1.5 hours at 25 to 30° C. under agitation. The solution was transferred to a five-liter four-neck flask equipped with a stirrer, condenser and dropping funnel. The resulting dimethyl 4,4'-(decamethylenedithio)dibutyrate was oxidized to the corresponding disulfone by the dropwise addition of 25% peracetic acid solution in ethyl acetate (1400 grams). The solution was allowed to cool and the precipitate was filtered. The crude disulfone was dissolved in acetone (one liter) and subjected to a second treatment with peracetic acid solution (100 grams) at 45° C. On cooling the disulfone crystallized, was filtered, and purified by subsequent recrystallization from dioxane and acetonitrile. It had a melting point at 130 to 132.5° C.

Part B.—Preparation of 4,4'-(decamethylenedisulfonyl)dibutyric acid

Dimethyl 4,4' - (decamethylenedisulfonyl)dibutyrate (35 grams) and sodium hydroxide solution (40 grams in 150 cc. water) were heated at reflux for 1.5 hours. The mixture was cooled and water (500 cc.) was added to dissolve the sodium salt. The solution was acidified to pH 1 with concentrated hydrochloric acid and filtered. To remove the sodium chloride the precipitate was washed with water. The acid was purified by recrystallizing it three times from dimethylformamide. The acid was obtained in 81% yield; its melting point was 204.5 to 206° C. Carbon and hydrogen contents for $$(CH_2)_{10}[SO_2(CH_2)_3COOH]_2$$

or $C_{18}H_{34}O_8S_2$ are:

Calculated: C=48.86% b.w.; H=7.75% b.w. Found on analysis: C=48.68% b.w.; H=7.66% b.w.

It is to be expected that numerous modifications will readily become apparent to those skilled in the art upon reading this description. All such modifications are intended to be included within the scope of the invention as defined in the appended claims.

We claim:

1. Compound having the general formula

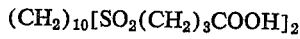

wherein the R's are divalent polymethylene groups containing from three to six carbon atoms, R' is a divalent radical selected from the group consisting of two to ten carbon atom alkylene hydrocarbon groups having a chain of at least two carbon atoms and para-xylylene group, and the X's stand for members selected from the group consisting of hydrogen and saturated lower alkyl radicals.

2. Compound as defined in claim 1 wherein the X's are methyl radicals.

3. Compound as defined in claim 1 wherein the X's are hydrogen.

4. Compound as defined in claim 1 wherein the R's are polymethylene radicals containing from three to six carbon atoms.

5. Compound as defined in claim 1 wherein the R's are trimethylene radicals.

6. Compound as defined in claim 1 wherein the R's are tetramethylene radicals.

7. Compound as defined in claim 1 wherein the R's are pentamethylene radicals.

8. Compound as defined in claim 1 wherein R' is a divalent alkylene radical containing from two to ten carbon atoms.

9. Compound as defined in claim 1 wherein R' is an ethylene radical.

10. Compound as defined in claim 1 wherein R' is a trimethylene radical.

11. Compound as defined in claim 1 wherein R' is a tetramethylene radical.

12. Compound as defined in claim 1 wherein R' is a pentamethylene radical.

13. Compound as defined in claim 1 wherein R' is a hexamethylene radical.

14. Compound as defined in claim 1 wherein R' is a decamethylene radical.

15. Compound as defined in claim 1 wherein R' is a 3-methylpentamethylene radical.

References Cited in the file of this patent

UNITED STATES PATENTS

| | | |
|---|---|---|
| 2,393,327 | Langkammerer | Jan. 22, 1946 |
| 2,552,269 | Emerson et al. | May 8, 1951 |
| 2,571,251 | Jones | Oct. 16, 1951 |
| 2,640,848 | Harman et al. | June 2, 1953 |
| 2,720,502 | Caldwell | Oct. 11, 1955 |

FOREIGN PATENTS

| | | |
|---|---|---|
| 849,244 | Germany | Sept. 11, 1952 |